US010616258B2

(12) United States Patent
Liang

(10) Patent No.: US 10,616,258 B2
(45) Date of Patent: Apr. 7, 2020

(54) SECURITY INFORMATION AND EVENT MANAGEMENT

(71) Applicant: Fortinet, Inc., Sunnyvale, CA (US)

(72) Inventor: Dong Liang, Beijing (CN)

(73) Assignee: Fortinet, Inc., Sunnyvale, CA (US)

( * ) Notice: Subject to any disclaimer, the term of this patent is extended or adjusted under 35 U.S.C. 154(b) by 676 days.

(21) Appl. No.: 14/052,713

(22) Filed: Oct. 12, 2013

(65) Prior Publication Data

US 2015/0106867 A1    Apr. 16, 2015

(51) Int. Cl.
*H04L 29/06* (2006.01)

(52) U.S. Cl.
CPC .......... *H04L 63/1433* (2013.01); *H04L 63/20* (2013.01)

(58) Field of Classification Search
CPC ...... G06F 21/552; G06F 21/554; G06F 21/50; G06F 2201/86; H04L 63/1416; H04L 63/1408; H04L 63/1425
See application file for complete search history.

(56) References Cited

U.S. PATENT DOCUMENTS

| 7,472,422 | B1* | 12/2008 | Agbabian | 726/25 |
|---|---|---|---|---|
| 8,272,061 | B1* | 9/2012 | Lotem et al. | 726/25 |
| 8,407,798 | B1* | 3/2013 | Lotem et al. | 726/25 |
| 8,739,290 | B1* | 5/2014 | Jamail et al. | 726/25 |
| 2006/0031938 | A1* | 2/2006 | Choi | G06F 21/552 726/25 |
| 2006/0265324 | A1* | 11/2006 | Leclerc et al. | 705/38 |
| 2008/0016569 | A1* | 1/2008 | Hammer et al. | 726/23 |
| 2008/0034424 | A1* | 2/2008 | Overcash et al. | 726/22 |
| 2011/0138471 | A1* | 6/2011 | Van De Weyer et al. | 726/25 |
| 2011/0270752 | A1* | 11/2011 | Neto et al. | 705/44 |
| 2012/0224057 | A1* | 9/2012 | Gill et al. | 348/143 |
| 2012/0254416 | A1* | 10/2012 | Fake et al. | 709/224 |
| 2012/0304300 | A1* | 11/2012 | LaBumbard | G06F 21/577 726/25 |
| 2013/0097709 | A1* | 4/2013 | Basavapatna et al. | 726/25 |
| 2013/0298244 | A1* | 11/2013 | Kumar et al. | 726/25 |
| 2013/0307682 | A1* | 11/2013 | Jerhotova et al. | 340/521 |
| 2013/0312101 | A1* | 11/2013 | Lotem | G06F 21/55 726/25 |
| 2014/0007238 | A1* | 1/2014 | Magee et al. | 726/24 |
| 2015/0213272 | A1* | 7/2015 | Shezaf | G06F 21/577 726/25 |

* cited by examiner

*Primary Examiner* — Techane Gergiso
(74) *Attorney, Agent, or Firm* — Jaffrey Watson Mendonsa & Hamilton, LLP

(57) ABSTRACT

Systems and methods for conducting correlation analysis for security events with assets attributes of a network by a SIEM device to enable more efficient reporting are provided. According to one embodiment, when a SIEM device obtains a security event, a risk level of the security event is calculated based on at least a correlation of the security event with one or more asset attributes of a network that is managed by the SIEM device. When the risk level meets a predetermined or configurable threshold, the SIEM device causes the security event to be reported to an administrator of the network.

15 Claims, 10 Drawing Sheets

SECURITY INFORMATION AND EVENT MANAGEMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013, Fortinet, Inc.

BACKGROUND

Field

Embodiments of the present invention generally relate to the field of network security techniques. In particular, various embodiments relate to security information and event management (SIEM) based on asset attributes of a network.

Description of the Related Art

A large computer network may comprise hundreds of client computers, servers and other network devices that may be located at different places. Multiple security devices, including, but not limited to firewalls, antivirus devices, Intrusion Prevention System (IPS) devices or Unified Threat Management (UTM) devices, can be deployed to regulate network access and protect the network from attacks. The security devices may use log files to track important network activities they capture. When the administrator of a large computer network wants to know the status of the whole network, a SIEM device may be deployed to collect all the logs from the multiple security devices. The SIEM device may send out an alarm to the administrator when a high risk event is received. The SIEM device may also generate a report to show the status of the network, such as the number, targets and sources of attacks that have been captured within a certain period. However, when a large number of security devices are deployed in a network, a SIEM device may generate too many alarms in view of the many security events collected from the security devices. Thus, there is a need for improved SIEM devices that report only those security events deemed most important to the network administrator.

SUMMARY

Systems and methods are described for conducting correlation analysis for security events with asset attributes of a network by a SIEM device to enable more efficient reporting. According to one embodiment, when a SIEM device obtains a security event, a risk level of the security event is calculated based on at least a correlation of the security event with one or more asset attributes of a network that is managed by the SIEM device. When the risk level meets a predetermined or configurable threshold, the SIEM device causes the security event to be reported to an administrator of the network.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
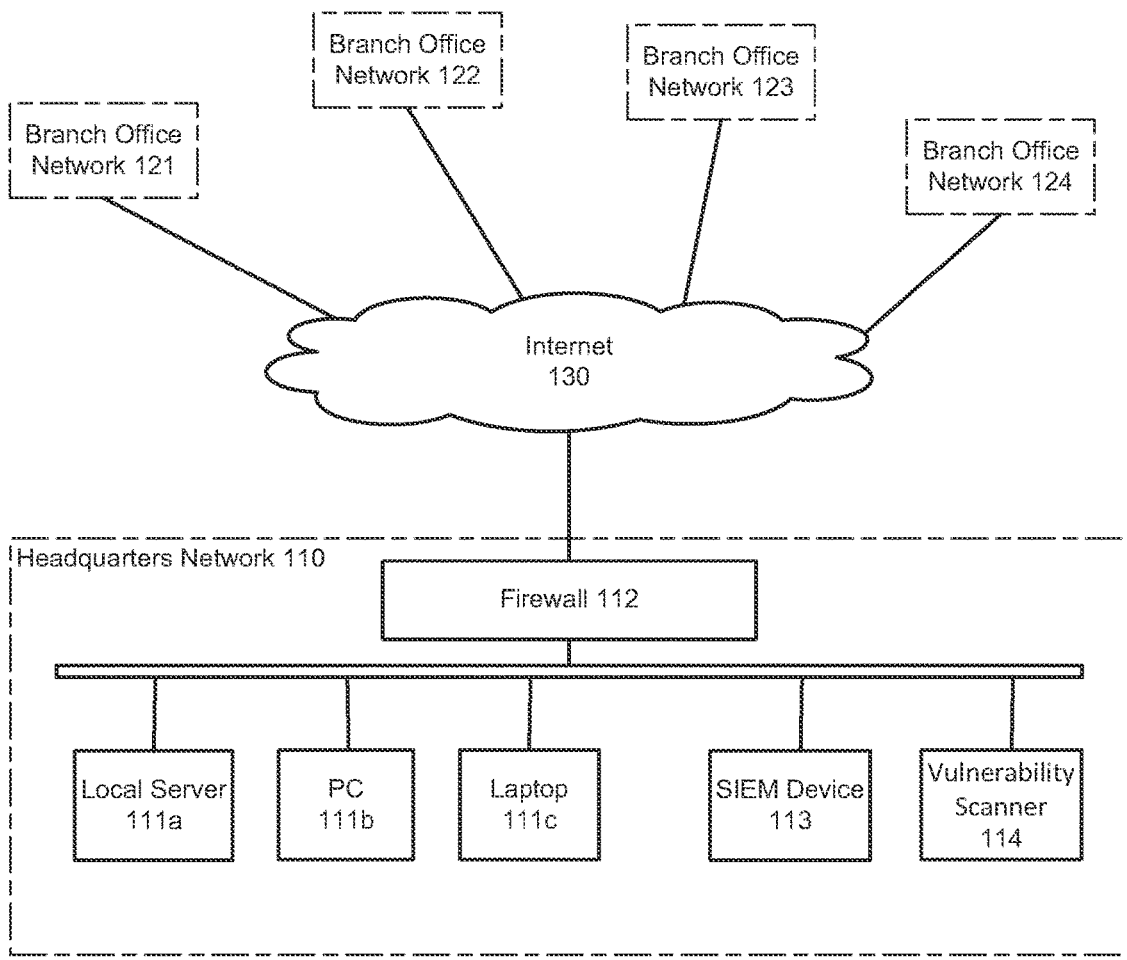
FIG. 1 illustrates an exemplary network architecture in accordance with an embodiment of the present invention.

Systems and methods are described for conducting correlation analysis for security events with asset attributes of a network by a SIEM device to enable more efficient reporting. For example, reporting of duplicate security events may be aggregated and reporting of security events directed at the core assets may be prioritized over others. In a computer network, some computing appliances are considered core assets as they provide critical services or store sensitive information. Meanwhile, the administrator may be less concerned about other appliances within the network. The SIEM device may identify security events that relate to the core assets and filter out other less important events so that the administrator may focus on the most important security events and not be disturbed by numerous alarms of lesser importance. According to one embodiment, when a SIEM device obtains a security event, a risk level of the security event is calculated based on at least the correlation of the security event with asset attributes of the network being managed by the SIEM device. An alarm may then be sent out directly or indirectly by the SIEM device to the administrator based on the risk level of the security event.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phase "security device" generally refers to a hardware device or appliance configured to be coupled to a network and to provide one or more of data privacy, protection, encryption and security. The network security device can be a device providing one or more of the following features: network firewalling, Virtual Private Networking (VPN), antivirus, IPS, content filtering, data leak prevention, antispam, antispyware, logging, reputation-based protections, event correlation, network access control, vulnerability management, load balancing and traffic shaping—that can be deployed individually as a point solution or in various combinations as a UTM solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, VPN, Internet Protocol (IP) security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary network architecture in accordance with an embodiment of the present invention. The network architecture 100 shown in FIG. 1 comprises a headquarters network 110, multiple branch office networks 121, 122, 123 and 124. The headquarters network 110 and branch office networks are connected through internetworks, such as Internet 130. Headquarters network 110 comprises multiple network appliances, such as local server 111a, PC 111b, laptop 111c and other computing devices that are operatively coupled to each other through a Local Area Network (LAN), wherein the LAN is then operatively coupled with firewall 112 which enable the access to Internet 130. Firewall 112 separates the external computing environment, represented by Internet 130, from the internal computing environment of headquarters network 110. Firewall 112 may intercept the communication between Internet 130 and the network appliances of headquarters network 110 and scan for malware, virus or other high risk network access. The internal structures of branch office networks 121-124 are omitted as they may be the same as that of headquarters network 110.

In the embodiment shown in FIG. 1, SIEM device 113 is connected to headquarters network 110. SIEM device 113 may collect security information and events from network security devices of headquarters network 110 and branch office networks 121-124. These security devices may include, but are not limited to, firewalls, IDSs, Web application firewalls (WAFs), system or Web scanning devices, Distributed Denial of Service (DDoS) mitigation appliances, anti-spam devices, anti-spam devices that protect the networks. These security devices capture network activities, such as data packets, file accesses, streams and sessions within internal networks or between internal networks and external networks. These security devices may inspect the network activities at one or more network layers and record all or abnormal network activities in their logs. The logs may be sent to SIEM device 113 in real time or periodically by these security devices. SIEM may also call a task in vulnerability scanner 114 to perform scanning of headquarters network 110 and/or branch office networks 121-124. Vulnerability scanner 114 may be any kind of vulnerability management devices that may be used for identifying and mitigating vulnerabilities that exist in computers or other network appliances. Although SIEM device 113 is located at headquarters network 110 as shown in FIG. 1, it will be apparent to one skilled in the art that SIEM device 113 may located within any of the internal networks 110 or 121-124. It is also apparent to one skilled in the art that SIEM device 113 may be a cloud-based logging service that collects logs from all internal networks. SIEM device 113 analyzes the logs from different security devices and provides an alarm to a network administrator when abnormal activity is detected. SIEM device 113 may also provide a report to the administrator regarding the status of the whole network, such as total number of attacks detected within in a particular time period and the distribution of sources and targets of the attacks.

SIEM devices are useful to an administrator of a large network, which may include hundreds of computing devices distributed among different locations. However, existing SIEM devices collect a large number of logs from the various security devices deployed throughout the enterprise and which may have disparate control and/or inspection functions. These devices may be provided by different manufacturers and generate logs in different formats. When an event, such as an attack on a host of the network, occurs, different security devices may detect the same event and/or capture information regarding the event at different levels or different locations. Additionally, the same event may be reported to the SIEM device by the different security devices. Existing SIEM devices may generate multiple alarms relating to the same event if the SIEM device does not know the correlation of the events reported by different security devices. Moreover, the SIEM device may generate too many alarms when a large number of logs are received.

This problem may be partially solved by setting up priorities for various events so that an alarm may be generated only when an important event occurs. In various embodiments of the present invention, a SIEM device 113 with a correlation engine (not shown) is provided so that events are sorted based on the correlation with asset attributes of the network. The structure and functions of the SIEM device according to one embodiment of the present invention will be described with reference to FIG. 2.

Figure 2:
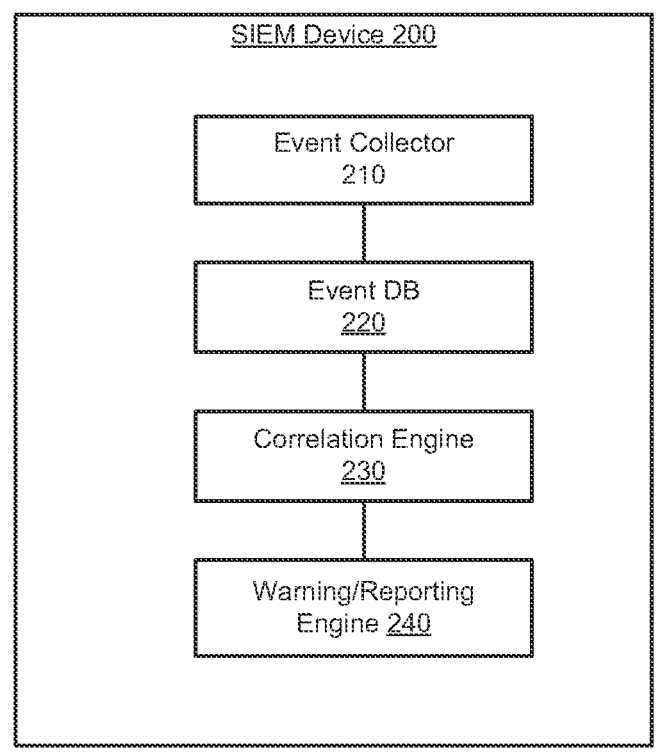
FIG. 2 illustrates exemplary functional units of a SIEM device in accordance with an embodiment of the present invention.

FIG. 2 illustrates exemplary functional units of a SIEM device 200 in accordance with an embodiment of the present invention. In the embodiment shown in FIG. 2, SIEM device 200 comprises an event collector 210, an event database (DB) 220, a correlation engine 230 and a warning/reporting engine 240. Event collector 210 is used for receiving original events from security devices deployed in the network that is managed by SIEM device 200. The original events may be network logs that are recorded and sent by the security devices in real time or periodically. The original events may be network activities that are sensitive or harmful to the security of the network, such as an attack to a web server of the network or an access to a host that is blocked by a firewall based on its policies. The network logs may contain all or a portion of the data packets that trigger the events and/or all or a portion of the data packets preceding and/or following detection of the event. Alternatively, the network logs may contain the most important information regarding the events, including, but not limited to, the source IP addresses, the destination IP addresses, protocols, ports, applications, times of the events and the like.

After the original events are received by event collector 210, the original events may be stored in event DB 220. In one embodiment, the original events may be normalized before being stored to event DB 220 since the original events may be sent by security devices of different manufacturers in different format. After normalization, the information that is useful for correlation may be retained and saved to event DB 220 in a unified format. It will be easier for correlation engine 230 to correlate events from different sources after the original events are normalized.

Correlation engine 230 is used for finding the correlations between events and assets of the network. A risk level of an event may be set and adjusted based on an asset value and/or other attributes of the target of the event in the network. If the target of the event is a core asset of the network, the calculated risk level of the event may result in a higher value relative to a calculated risk level of a non-core asset. For example, a web server providing the most important web application for a company would be considered a core asset of the whole network and would typically be assigned a high asset value. When an attack is targeting this web server, the determined risk level of this attack is high and therefore an alarm is more likely to be generated by SIEM device 200. On the other hand, a client PC within the network would typically be considered a non-core asset of the network or may not even be present in the asset list of the network. When an attack is targeting this client PC, the determined risk level is low and therefore no alarm is sent to the administrator. The structures and functions of correlation engine will be described further below with reference with FIG. 3.

Warning/reporting engine 240 is used for sending an alarm or report to the network administrator when the risk level of an event is higher than a predetermined or configurable threshold. The warning may be a syslog sent to a remote terminal or an electronic mail (Email) or Short Message Service (SMS) message sent to the administrator. In one embodiment, the administrator may configure the predetermined threshold and warning policies that define the channels and timing of alarms that should be sent for events with different risk levels.

Figure 3:
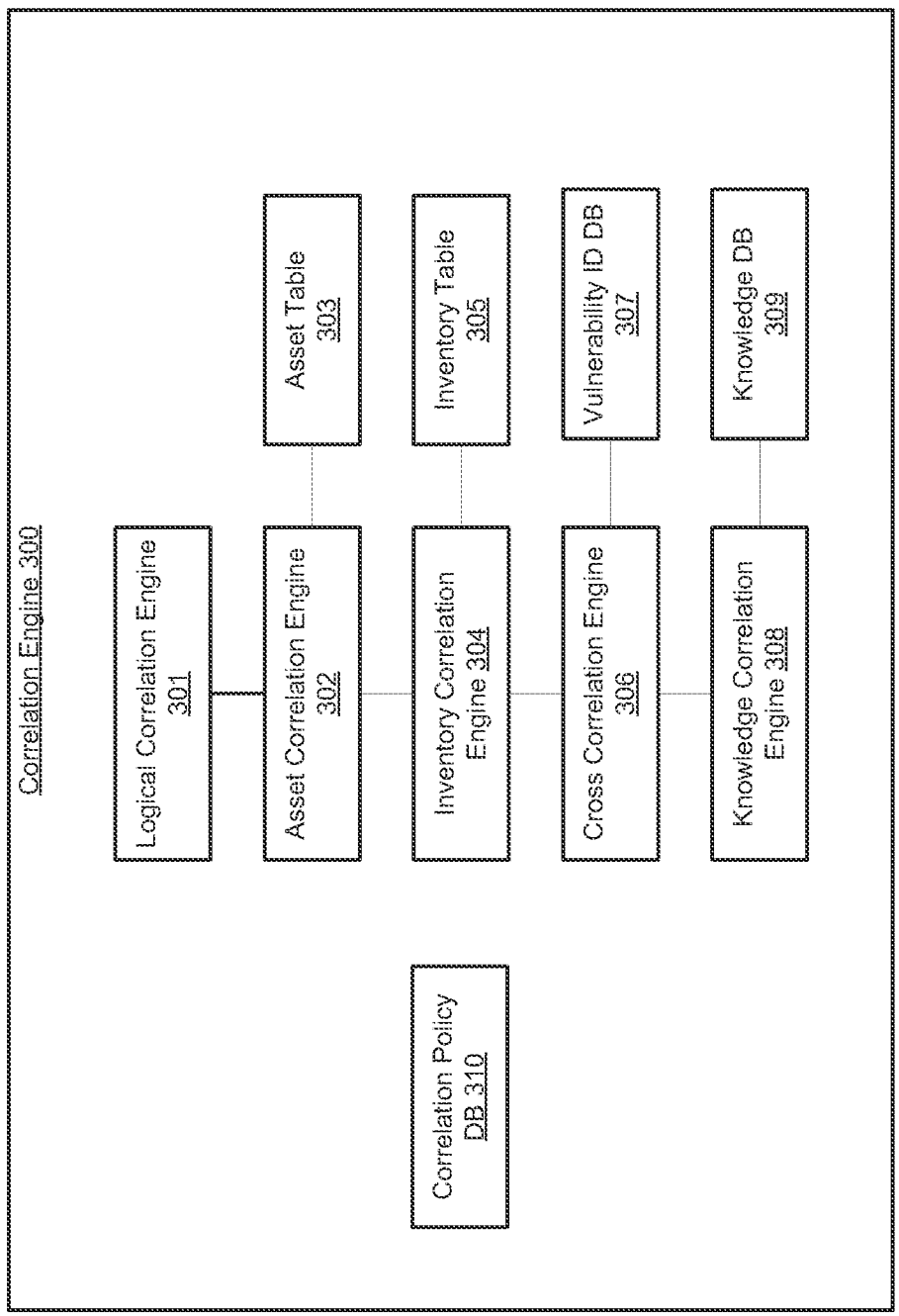
FIG. 3 illustrates exemplary functional units of a correlation engine in accordance with an embodiment of the present invention.

FIG. 3 illustrates exemplary functional units of a correlation engine 300 in accordance with an embodiment of the present invention. In this embodiment, correlation engine 300 conducts logical correlation, asset correlation, inventory correlation, cross correlation and knowledge correlation and calculates a risk level of an event based on the correlation between the event and asset attributes of a network. In the present example, correlation engine 300 comprises a logical correlation engine 301, an asset correlation engine 302, an asset table 303, an inventory correlation engine 304, an inventory table 305, a cross correlation engine 306, a vulnerability ID DB 307, a knowledge correlation engine 308, a knowledge DB 309, an event table 311 and a correlation policy DB 310.

Logical correlation engine 301 is used for conducting logical correlation to the original events so that related or repeated events may be combined to one security event. Original events are captured by different security devices at different locations, different network segments and different network layers. In some cases, the same event may be captured and logged by multiple security devices and SIEM device may receive multiple original events for the same events. In some other cases, different events are captured by different security devices and these events may be associated with the same attack. These events relating to the same attack may be connected to form a complete attack procedure. For example, in correlation policy DB 310, a logical correlation policy may define events having the same source IP address, destination IP address, protocol, port and web application as a repeat event. Another logical policy may define events having the same destination IP address, protocol, port and web application, but different source IP addresses and occurring within a certain period as a related event. Logical correlation engine 301 reads the original events from event DB and logically correlates the original events based on logical correlation policies defined in correlation policy DB 310. After logical correlation, one security event is extracted from the repeated or related original events and others events may be discarded. Alternatively, instead of extracting one event from repeated or related events, a new security event may be generated to represent the repeated or related original events. The reliability of the new event is higher than the ones it is extracted from. The security events extracted or generated by logical correlation engine 301 is sent to asset correlation engine 302.

According to one embodiment, asset correlation engine 302 is used for conducting asset correlation among the security events and the assets of a network so that only security events relating to core network assets will generate notifications to the administrator of the network. To conduct the asset correlation, asset table 303 may be setup to register all or a subset of assets (e.g., core assets) of the network. Depending upon the particular implementation, asset table 303 may be created automatically by scanning the network or setup manually by the administrator. In the context of the present example, each asset is provided with an asset value representing the importance of the asset to the network. When a core asset that has a high asset value is under attack, a high risk level is associated with the security event and an alarm is more likely to be generated to warn the administrator. An example of an asset table is shown in Table 1.

TABLE 1

Exemplary Asset Table

| Name | Asset Value | Internal IP | External IP | Domain Name | MAC Address | Loc. |
|---|---|---|---|---|---|---|
| Web Server 1 | 4 | 192.168.1.2 | 66.171.121.34 | www.fortinent.com | 8C-70 . . . | HQ |
| Mail Server 1 | 4 | 192.168.1.3 | 208.91.113.80 | Mail.fortinent.com | 8C-70 . . . | HQ |
| PC 1 | 1 | 192.168.2.1 | | | 8C-70 . . . | B1 |
| PC 2 | 3 | 192.168.2.2 | | | 8C-70 . . . | B2 |

According to one embodiment, when asset correlation engine 302 receives a security event, the destination IP address of the security event is extracted and checked against the IP addresses in asset table 303. If the destination IP address is not in asset table 303, it means that the target of the attack is not within the assets of the network or the attack is targeting an asset that is not of concern to the administrator. If the destination IP address is located within asset table 303, the corresponding asset value is extracted and a risk level of the security event may be calculated based on the asset value. For example, the risk level of an event may be calculated as follows:

$$RiskLevel[0\sim5]=AssetValue[0\sim5]*DestructionLevel[0\sim5]*Reliability[0\sim10]/50$$

where,

AssetValue is a parameter that represents the importance level of an asset.

DestructionLevel is a parameter that represents destructiveness of a security event. For example, a virus that may cause damage to a computer or network system may be given a high DestructionLevel, while a security event that triggers a firewall policy may be given a low DestructionLevel. Usually, the DestructionLevel is a fixed number and is not adjusted during the procedure of correlation.

Reliability is a parameter that represents the accuracy of the RiskLevel and may be retrieved from knowledge DB the event belongs to. It may be adjusted based on further attributes of the asset. This will be described further below.

It will be apparent to one skilled in the art that RiskLevel may be calculated based on the asset value in other manners, using parameter weightings, for example, as follows:

$$RiskLevel[0\sim5]=w1*AssetValue+w2*DestructionLevel+w3*Reliability$$

Further, it will be apparent to one skilled in the art that a target of an attack or a security event may be identified by other attributes besides and/or in addition to the destination IP address. For example, when the destination IP address of a security event is an internal IP address that is not a unique IP address in asset table 303, a path in a Uniform Resource Locator (URL) may be used for identifying the actual server that serves this URL. After the actual server is identified, the corresponding asset value may be exacted to calculate the risk level of the security event.

In one embodiment, after the risk level is calculated by asset correlation engine 302, it may be further adjusted by inventory correlation engine 304 based on further attributes of the target of a security event. For example, if a MySQL attack is targeting a host that is a core asset of a network, asset correlation engine 302 may assign a high risk level to that attack. However, if the host does not provide MySQL services, the attack will not affect the host and it is not necessary to generate an alarm for that attack even though the target of the attack is a core asset of the network. Therefore, inventory correlation engine 304 may decrease the risk level calculated by the asset correlation engine 302. Optionally, inventory correlation engine 304 may keep the risk level calculated by the asset correlation engine 302 unchanged if no attributes relating to the security event are found by inventory correlation engine 304. To register the attributes of an asset and adjust the risk level based on the attributes, inventory table 305 may be created automatically by scanning the network or may be setup manually by the administrator for each asset of the network. Inventory table 305 may contain hardware and software attributes of a particular asset and a reliability value may be given to each attribute in the table to define the reliability that an event affects the particular asset based on the attribute at issue. An exemplary inventory table of a mail server is shown in Table 2.

TABLE 2

Exemplary Inventory Table of a Mail Server

| | Attribute | Reliability |
|---|---|---|
| OS | Windows Server 2012 | 4 |
| Service list | Exchange Server | 3 |
| Protocols list | POP3, SMTP, Exchange | 3 |
| Ports list | 110, 587, 593 | 3 |

According to one embodiment, when a security event and its currently calculated risk level is received, inventory correlation engine 304 may extract attributes related to the security events from a knowledge DB. The knowledge DB may collect and store information, including, but not limited to, services, protocol, ports, firmware, operation systems, patches, plug-ins and the like, that relate to system vulnerabilities, viruses and/or network attacks. Then, inventory correlation engine 304 searches for the attributes relating to the security event in inventory table 305 of the target asset. If an attribute, such as a service, of the security event is in the inventory table 305, it means that the security event is targeting a particular service that is provided by the target asset. In such a situation, it is more likely that the security event will affect the target and the risk level of the security event should typically be adjusted higher. Therefore, a corresponding reliability value is extracted from inventory table 305 and the risk level of the security event is adjusted accordingly. An individual reliability value for each attribute is provided in Table 2 to adjust the risk level more concisely.

It will be apparent to one skilled in the art that the individual reliability value may be omitted and a default value may be used for adjusting the risk level.

Cross correlation engine 306 may further adjust the risk level of the security event based on whether a vulnerability that an attack is targeting exists in the target host. Vulnerability ID DB 307 is used for recording vulnerabilities that are exploited by attacks. Attributes of attacks, including, but not limited to, information contained within the Common Vulnerabilities and Exposures (CVE) system, BugTraq or S3CVE, may be stored in vulnerability ID DB 307. When a security event is received by cross correlation engine 306, the corresponding vulnerability of the security event is searched for within vulnerability ID DB 307. If cross correlation engine 306 can't make a correlation between the attack and vulnerability based on standard attributes, it may use knowledge correlation policy 309 to find the corresponding vulnerability. If a vulnerability ID is not found in vulnerability ID DB 307 and the last scanning task has been finished for a certain period, cross correlation engine 306 may invoke inspection or scanning tools to scan the target host for the corresponding vulnerability. If the cross inspection by the scanning tool shows that the corresponding vulnerability exists in the target host, the risk level will be increased by cross correlation engine 306 by increasing its reliability. Otherwise, the risk level may be decreased or left unchanged.

Further, if no vulnerability can be identified in vulnerability ID DB 307, knowledge correlation engine 308 may search knowledge DB 309 to find corresponding vulnerabilities related to the attack at issue. If a vulnerability relating to the attack is found in knowledge DB 309, knowledge correlation engine 308 may invoke inspection or scanning tools to scan the target host for the corresponding vulnerability. If the inspections show that the corresponding vulnerability exists in the target host, the risk level provided by the other correlation engines may be increased by cross correlation engine 306. Otherwise, the risk level may be decreased or left unchanged.

In the embodiment shown in FIG. 3, correlation engine 300 comprises multiple sub correlation engines to conduct corresponding correlation processing. However, it is not necessary to conduct every correlation process for every security event. Correlation policy DB 310 is used for defining what correlation processing should be conducted for each type of security event. It is also possible to define the order that the correlation processing is conducted. For example, one correlation policy in correlation policy DB 310 may define that only logical correlation and asset correlation are conducted for a DDoS attack because DDoS attacks usually do not target vulnerabilities of a host. Another correlation policy may specify that all the correlation processing should be conducted for a MySQL attack so that the most accurate risk level may be reported to the administrator.

Figure 4:
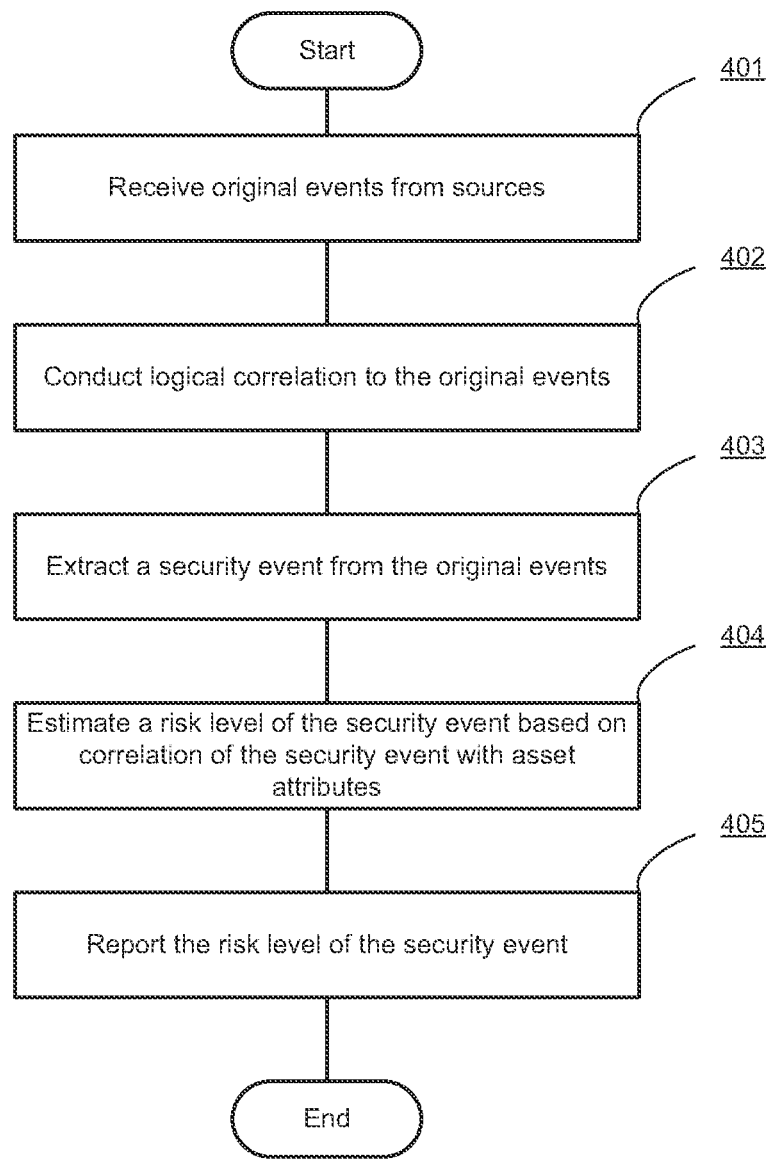
FIG. 4 is a flow diagram illustrating a method for analyzing correlations of security events in accordance with an embodiment of the present invention.

FIG. 4 is a flow diagram illustrating a method for analyzing correlations of security events in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 401, a SIEM device receives original events from data sources. These data sources may be network security devices or other computing devices that are deployed at different locations. The original events may be network logs that are recorded and sent by the security devices or the computing devices in real time or periodically. The original events may be network activities that are sensitive or harmful to the security of the network, such as attacks on a web server of the network or accesses to a host that are blocked by a firewall based on its policies. As noted above, the network logs may contain all or a portion of the data packets that trigger the events and/or all or a portion of the data packets preceding and/or following detection of the event. Alternatively, the network logs may contain the most important information regarding the events, including, but not limited to, the source IP addresses, the destination IP addresses, protocols, ports, applications, times of the events and the like.

At block 402, the SIEM device conducts logical correlation to the original events based on predetermined logical correlation policies. The original events collected by multiple security devices may be correlated logically. For example, multiple events logged by multiple security devices may actually relate to the same event because all of these security devices captured the same event at different network layers or different locations of the network. Moreover, an attack to a network may last for several hours or a few days. An attack may originate from the same source but target different destinations of the network or originate from different sources but target the same destination. A series of events that are generated from these kinds of attacks may also be correlated. These repeated or related events can be logically correlated based on the original IP addresses, destination IP addresses, protocols, ports, create times and/or the like.

At block 403, a security event may be extracted from the repeated or related original events that are found by logical correlation or a new security event may be generated to represent the repeated or related original events. By extracting or generating one security event to represent multiple correlated events, the number of events that need further correlation processing will be reduced and more accurate and efficient alarms may be provided.

At block 404, the SIEM device estimates a risk level of the security event based on correlation of the security event and asset attributes of the network. If the security event is targeting a core network asset that is providing critical services of the network, a high risk level is assigned to the security event. If the target of the security event is not within the network or is not among the core assets, a low risk level is assigned to the security event. The risk level of the security event may also be adjusted based on other attributes of assets of the network. An exemplary procedure for estimating the risk level of a security event will be described in further detail below with reference to FIGS. 5-9.

At block 405, the SIEM device reports the risk level of the security event to the administrator of network. Optionally, the SIEM device only reports the security event when its risk level is higher than a predetermined or configurable threshold. The administrator may set up policies to configure how to report the security device based on the risk level. The SIEM device may generate and send an alarm Email/SMS/Syslog message to the network administrator or send a syslog message to a remote terminal. By sending out alarms for the events that relate to core assets of a network and filtering out other events, the administrator may focus on the important events even when a large number of security events are collected from the whole network.

Figure 5:
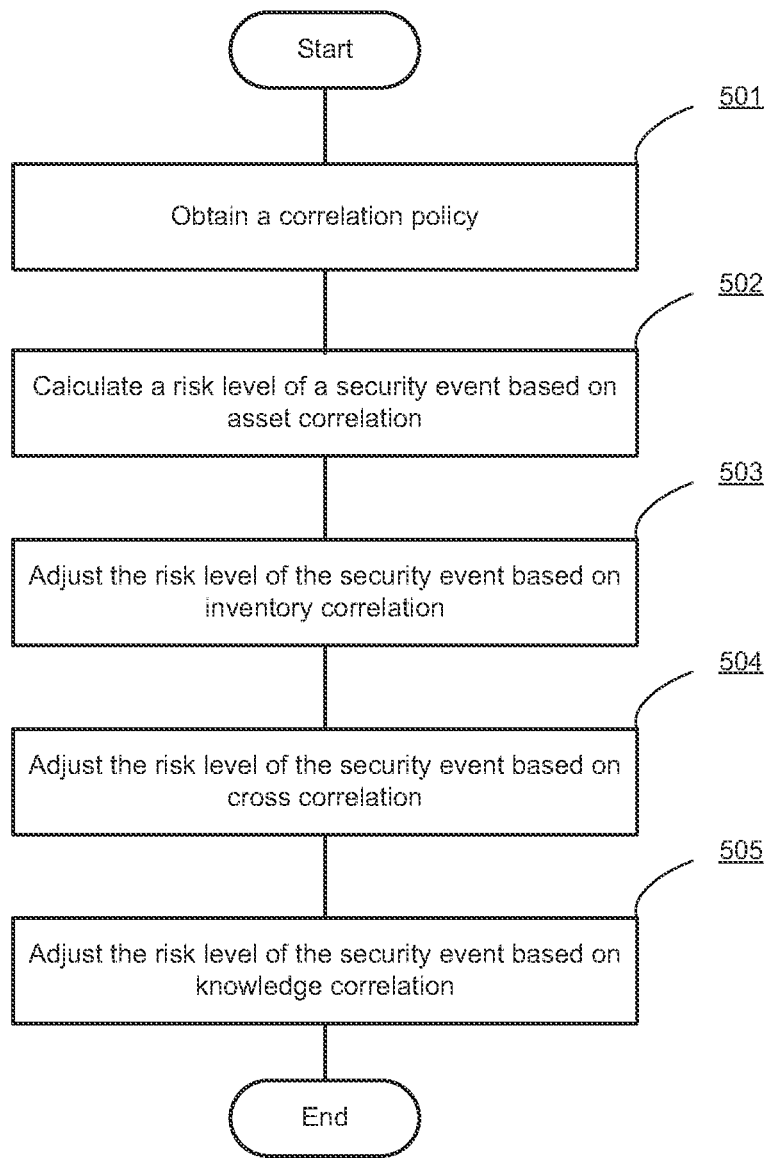
FIG. 5 is a flow diagram illustrating a combined correlation processing in accordance with an embodiment of the present invention.

FIG. 5 is a flow diagram illustrating a combined correlation processing in accordance with an embodiment of the present invention. In this embodiment, a correlation engine of a SIEM device may conduct multiple correlation processing for a security event and may use multiple asset attributes of a network based on the correlation policies.

At block 501, when a security event is received by a correlation engine, a corresponding correlation policy may be obtained so that the correlation engine may conduct one or more correlations for the received security event. The SIEM device may receive different kinds of security events and each kind of event may relate to some aspect of the network. For some events, an asset correlation based on whether the events are targeted at the core assets of the network is enough for estimating the risk level of the events. For other events, multiple correlations based on multiple assets attributes of the network are conducted so that the correlation engine may calculate more accurate risk levels. The administrator may configure a correlation policy for each kind of security event to define which correlation processing should be conducted for a security event and how the correlation processing results should be combined.

At block 502, the correlation engine calculates a risk level of a security event based on asset correlation. In this embodiment, a target of a security event is searched in an asset table of a network. If the target is found in the asset table, an asset value corresponding to the target is extracted and a risk level of the security event is calculated based on the asset value. If the target of the security event has a high asset value (the asset is important to the security of the network or the administrator wants to receive an alarm when the asset is attacked), the resulting calculated risk level of the security event will be a relatively high value. Exemplary asset correlation processing will be described in further detail with reference to FIG. 6.

At block 503, the correlation engine may adjust the risk level of the security event based on a reliability value relating to an inventory attribute of the target of the security event when the security event relates to the inventory attribute. Usually, an attack targets a leak or vulnerability that exists in a particular environment, such as a service, a port or an operation system. If the host does not have the particular environment that the attack needs, the attack may not actually harm the host. In such circumstances, the correlation engine may decrease the risk level associated with the attack or keep the risk level unchanged and no alarm will be generated even if the target asset is a core asset of the network. On the other hand, if the target asset does provide the particular environment that the attack needs, it is more likely that the attack may harm the target asset. In such circumstances, the correlation engine may increase the risk level associated with the security event by increasing its reliability, for example. Exemplary inventory correlation processing will be described in further detail below with reference to FIG. 7.

At block 504, the correlation engine adjusts the risk level of the security event by checking if a vulnerability that the event targets exists in the target asset by the standard attributes of the event. If the vulnerability does not exist and the last scanning task has been finished for a certain period, the correlation engine may conduct a cross correlation by invoking multiple inspection tools to check if a vulnerability that an attack is targeting exists in the target asset. If any inspection tools find the vulnerability in the target asset, the correlation engine increases the risk level of the attack.

Exemplary cross correlation processing will be described in further detail with reference to FIG. 8.

At block 505, the correlation engine adjusts the risk level of the security event by checking if a vulnerability that is known based on knowledge DB exists in the target asset. In one embodiment, the correlation engine conducts a knowledge correlation by invoking multiple inspection tools to check if a vulnerability that an attack is targeting exists in the target asset. If any inspection tools find the vulnerability in the target asset, the correlation engine increases the risk level of the attack. Exemplary knowledge correlation processing will be described in further detail with reference to FIG. 9.

Figure 6:
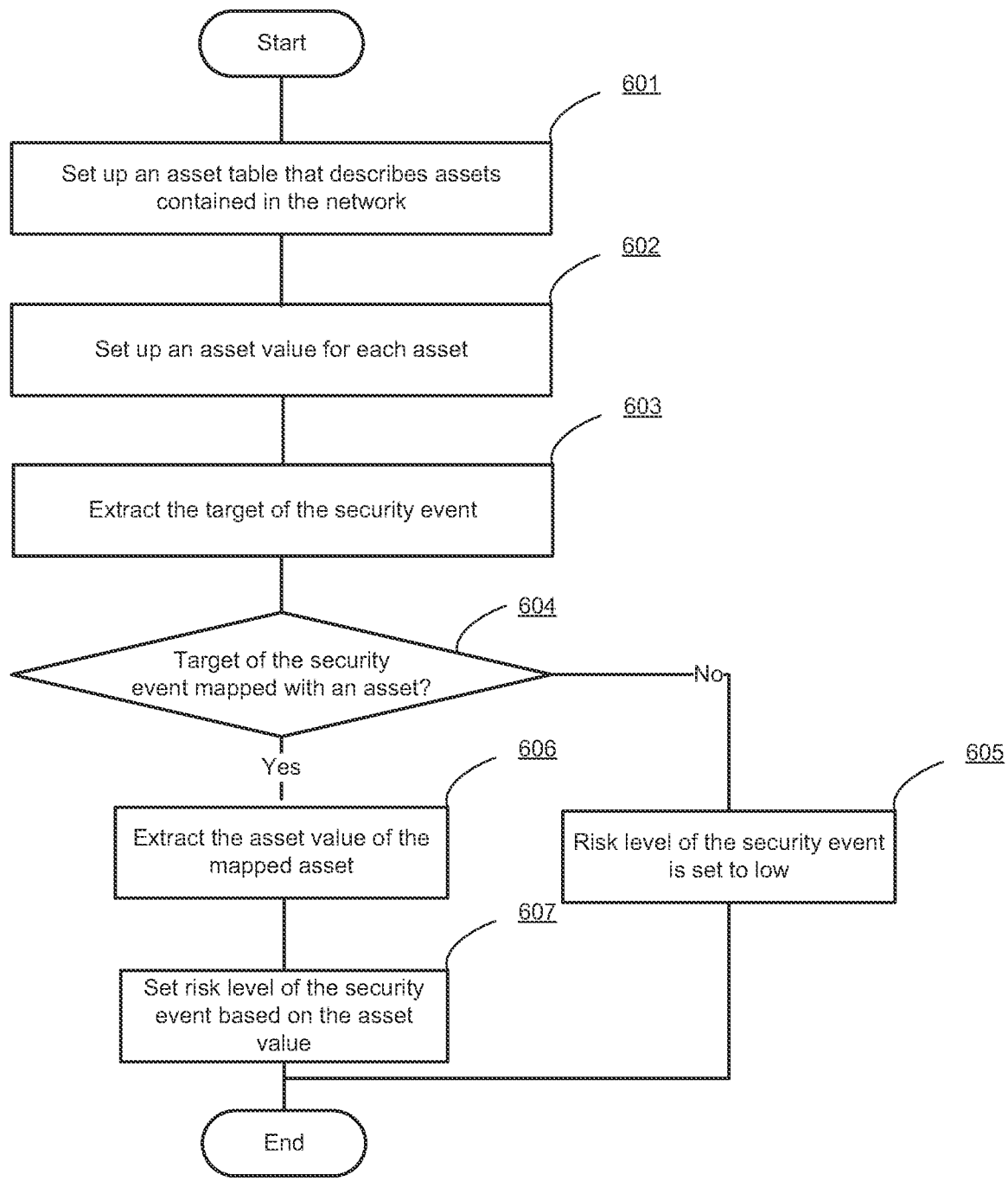
FIG. 6 is a flow diagram illustrating asset correlation processing in accordance with an embodiment of the present invention.

FIG. 6 is a flow diagram illustrating asset correlation processing in accordance with an embodiment of the present invention.

At block 601, an asset table is setup to register all or a subset of assets (e.g., core assets) of the network. Asset table may be created automatically by scanning the network or setup manually by the administrator. The asset table may contain the hosts, Websites, network segments or network segment groups of a network that are managed by a SIEM device. The internal IP addresses, external IP addresses, MAC addresses, domain names, services and/or other attributes that may identify the hosts or network segments may be registered in the asset table.

At block 602, each asset is provided with an asset value that represents the relative importance of the asset within/to the network. Core assets that provide critical services of the network may be given high asset values relative to other non-core assets. When a core asset that has a high asset value is under attack, an alarm is more likely to be generated to warn the administrator.

At block 603, when asset correlation engine receives a security event, the target of the security event is extracted. The target may be determined by an IP address, domain name and/or service associated with the security event.

At block 604, the asset correlation engine searches the asset table for the target of the security event to check if the target of the security event is a registered asset of the network.

If the target of the security event is not found in the registered assets of the network, it means that the target of the attack is not within the assets of the network or the attack is targeting an asset that is not of concern or is of relatively little concern to the administrator. A low risk level is given to the security event by the asset correlation engine at block 605.

If the target of the security event is found within the registered assets, it means that the target of the attack is an asset that is of concern to the administrator. The corresponding asset value of the target in the asset table is extracted at block 606. A risk level of the security event may be calculated based on the asset value at block 607.

Figure 7:
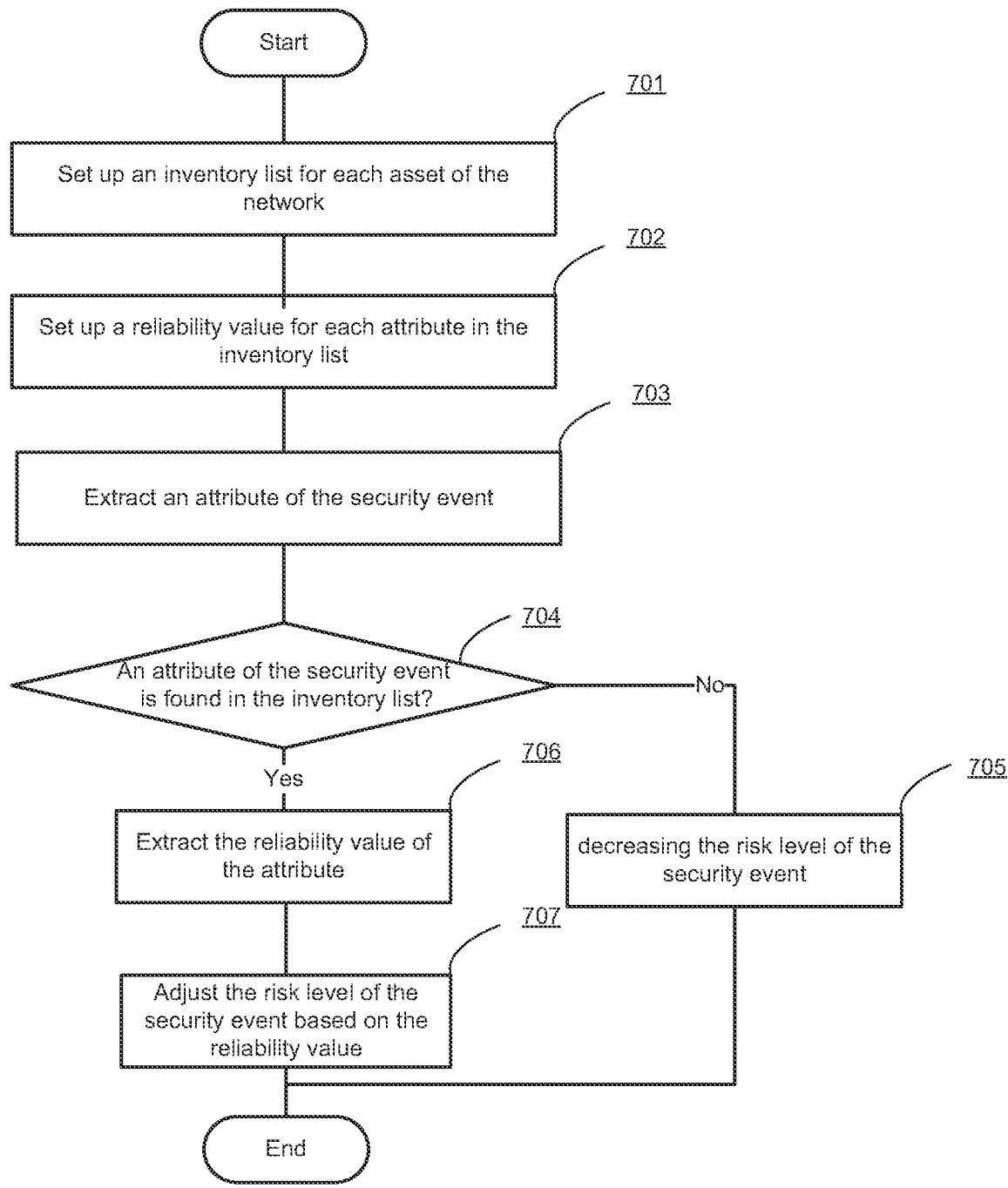
FIG. 7 is a flow diagram illustrating inventory correlation processing in accordance with an embodiment of the present invention.

FIG. 7 is a flow diagram illustrating inventory correlation processing in accordance with an embodiment of the present invention.

At block 701, an inventory list is setup for each asset of the network to register all or a subset of the attributes (e.g., core attributes) of the asset. Inventory list may be created automatically by scanning each asset of the network or setup manually by the administrator. The inventory list may register the software and hardware environment of an asset, including, but not limited to, services, ports, operating system, Basic Input/Output System (BIOS), software, patches and the like of a host.

At block 702, each attribute of the inventory table is provided with a reliability value that defines the reliability that a security event will affect the asset based on this attribute. In one embodiment, an attribute that is vulnerable to one or more attacks is given a relatively high reliability value. When an attribute that has a high reliability value exists in the target asset, the risk level of the security event is adjusted to be higher so that an alarm is more likely to be generated to warn the administrator. In other embodiments, a default reliability value may be given to all the attributes to simplify the inventory correlation processing.

At block 703, when asset correlation engine determines that a target of an attack is within the registered assets of a network, the environment that the attack relies on is further identified. In one embodiment, a knowledge DB may be checked to find out what environment an attack needs to actually harm a host. A list of attributes of attack may be extracted from the knowledge DB.

If the attributes of the attack are not found in the inventory list of the target asset, it means that the target asset of the attack does not possess the environment that the attack relies on and it may not be affected by the attack. As such, the risk level output by the prior correlation process (e.g., the asset correlation engine) may be decreased by the inventory correlation engine at block 705.

On the other hand, if an attribute of the attack is found in the inventory list of the target asset at block 704, it means that the target asset does possess the environment needed by the attack and it is more likely be affected by the attack. As such, the corresponding reliability value of the attribute is extracted from the inventory list of the target asset by the inventory correlation engine at block 706 and a risk level of the security event calculated by the prior correlation process (e.g., the asset correlation engine) may be adjusted based on the reliability value at block 707.

Figure 8:
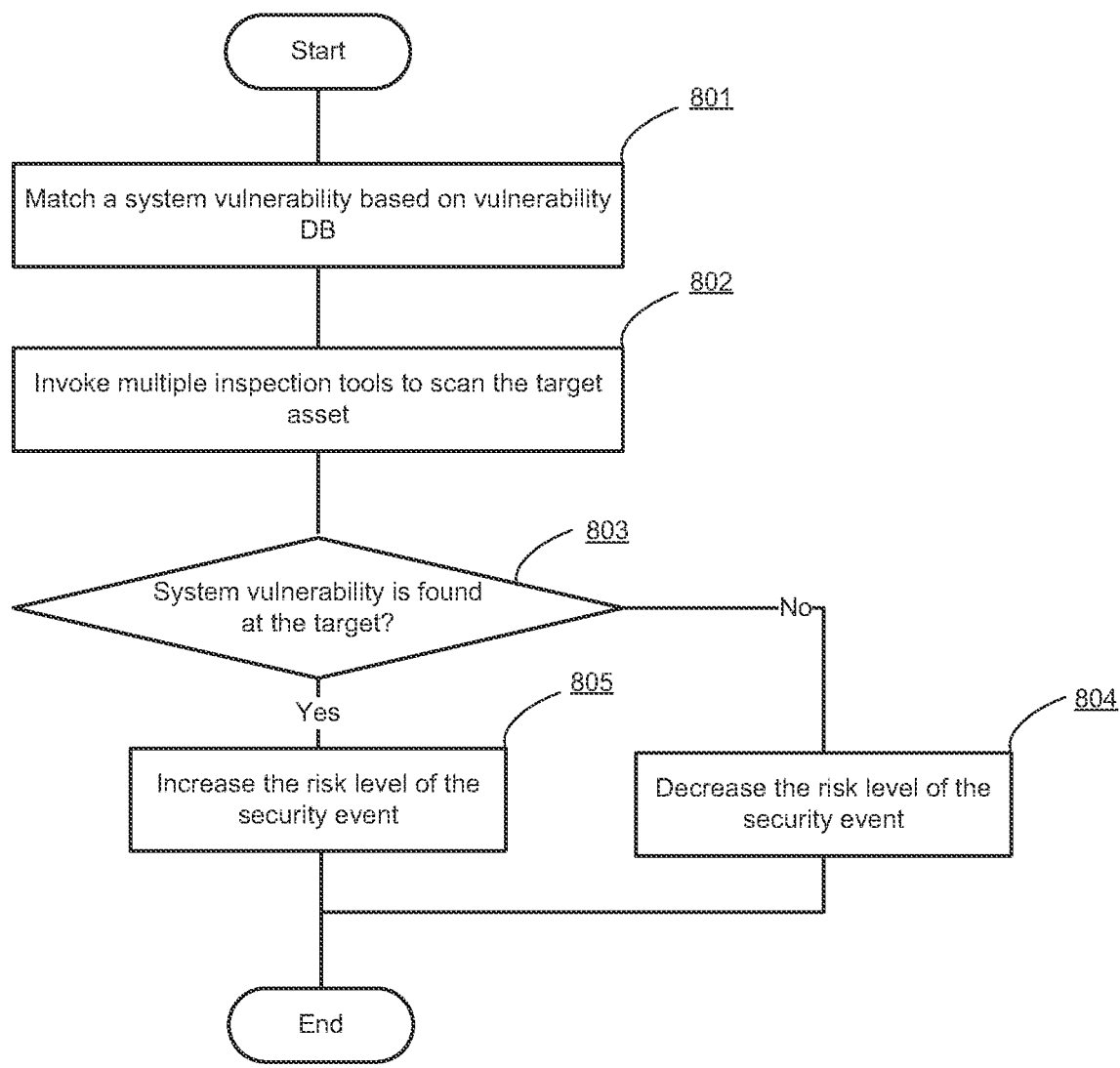
FIG. 8 is a flow diagram illustrating cross correlation processing in accordance with an embodiment of the present invention.

FIG. 8 is a flow diagram illustrating cross correlation processing in accordance with an embodiment of the present invention. In the context of the present example, cross correlation is used for determining if a vulnerability that an attack is targeting exists in the target host. Multiple inspection tools may be invoked to check the target asset for the vulnerability. The results of the inspection tools may be combined to determine if the vulnerability exists in the target asset. By adjusting the risk level of the security event based on whether the vulnerability exists in a target asset, the risk level of the security event may be made more accurate.

At block 801, a security event is searched for by a cross correlation engine in vulnerability ID DB to determine if a vulnerability in the database is related to the security event.

If a known vulnerability is found in the vulnerability ID DB, multiple inspection tools for the vulnerability may be invoked by the cross correlation engine to scan the target asset at block 802. The inspection tools may include, but are not limited to, IPS applications, anti-virus applications, Web leak detector applications and other UTM applications. The application processing units may be logical or physical units, encompassing one or more hardware devices or software applications.

At block 803, the cross correlation engine collects the scanning results from the inspection tools and determines if the system vulnerability exists in the target asset. It will be apparent to one skilled in the art that one or more inspection tools may be used to check a particular vulnerability and results from multiple inspection tools may be used for cross verification of the existence of the vulnerability.

If the vulnerability is not found by the inspection tools, the risk level provided by asset correlation engine or inventory engine may be decreased at block 804.

If the vulnerability is found by the inspection tools, the risk level provided by asset correlation engine or inventory engine may be increased at block 805.

Figure 9:
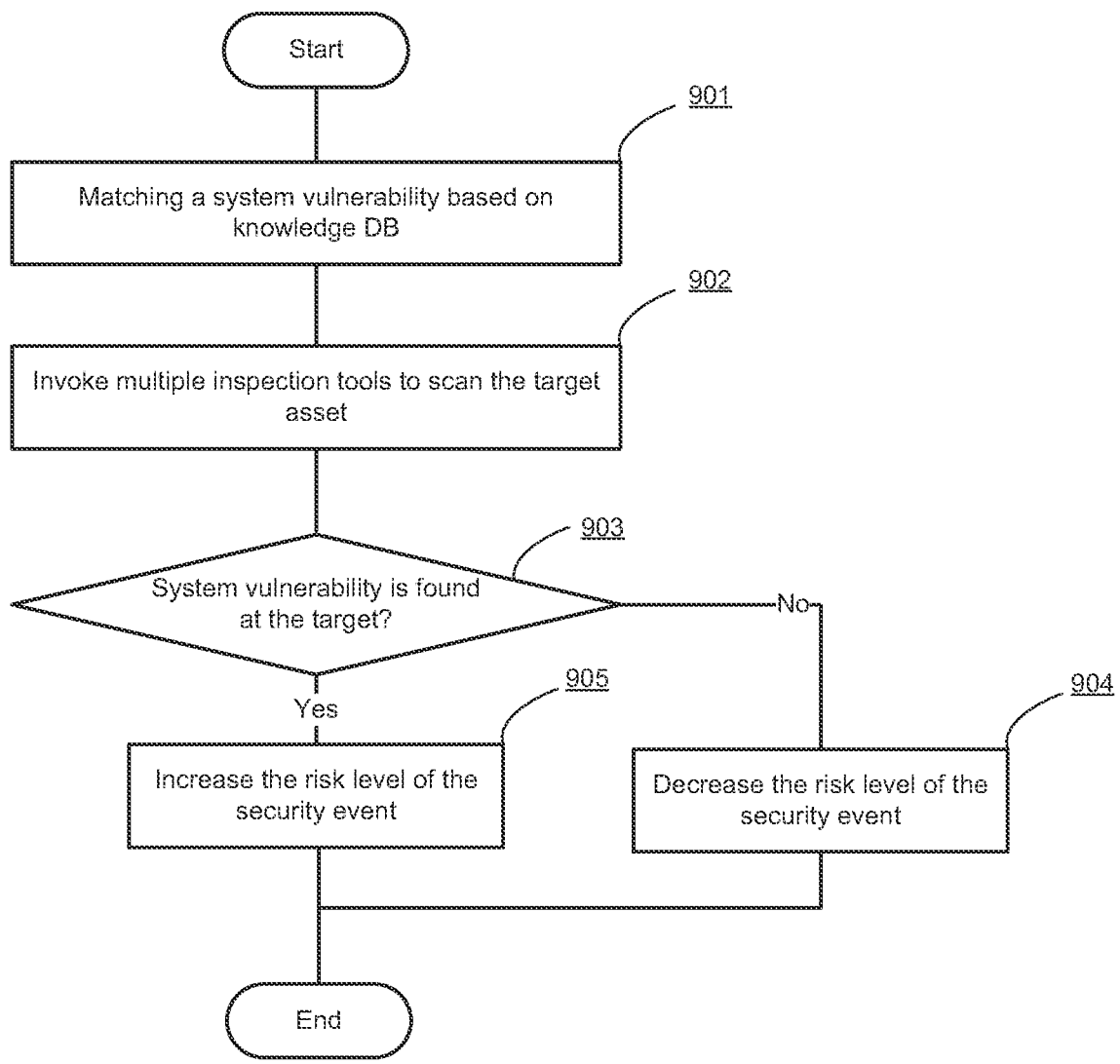
FIG. 9 is a flow diagram illustrating knowledge correlation processing in accordance with an embodiment of the present invention.

FIG. 9 is a flow diagram illustrating knowledge correlation processing in accordance with an embodiment of the present invention. In the context of the present example, knowledge correlation may be used to perform further checking for vulnerabilities in the target host. Usually, if a vulnerability cannot be found in the vulnerability ID DB, knowledge correlation engine may perform further checking with reference to a local, remote or cloud-based knowledge DB to further search corresponding vulnerabilities that may be related to the security event and verify if they exist in the target asset. The risk level of the security event may be further adjusted depending upon the results.

At block 901, a security event is searched for by a knowledge correlation engine in a knowledge DB to determine if a vulnerability in the knowledge DB is related to the security event. If vulnerability is found in the knowledge DB, multiple inspection tools for the vulnerability are invoked by the knowledge correlation engine for scanning the target asset at block 902. At block 903, the knowledge correlation engine collects the scanning results from the inspection tools and determines if the system vulnerability exists in the target asset. If the vulnerability is not found by the inspection tools, the risk level provided by asset correlation engine or inventory engine may be decreased at block 904. If the vulnerability is found by the inspection tools, the risk level provided by asset correlation engine or inventory engine may be increased at block 905.

Figure 10:
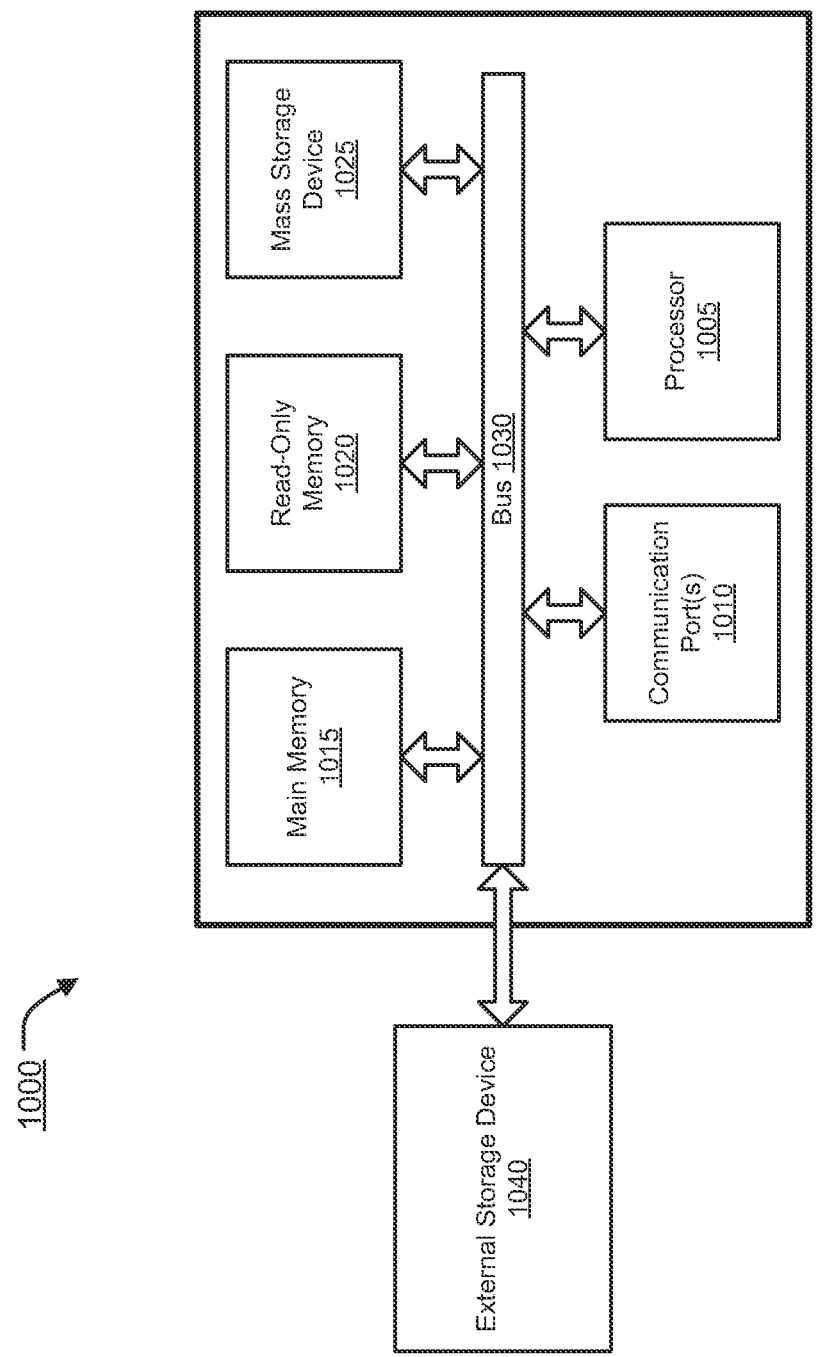
FIG. 10 is an exemplary computer system in which or with which embodiments of the present invention may be utilized.

FIG. 10 is an example of a computer system 1000 with which embodiments of the present disclosure may be utilized. Computer system 1000 may represent or form a part of a security device that performs human user verification when a high risk network access is captured.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1000 includes a bus 1030, a processor 1005, communication port 1010, a main memory 1015, a removable storage media 1040, a read only memory 1020 and a mass storage 1025. A person skilled in the art will appreciate that computer system 1000 may include more than one processor and communication ports.

Examples of processor 1005 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1005 may include various modules associated with monitoring unit as described in FIGS. 2-4. Communication port 1010 can be any of an RS-232 port for use with a modem based dialup connection, a 10/100 Ethernet port, a Gigabit or 10 Gigabit port using copper or fiber, a serial port, a parallel port, or other existing or future ports. Communication port 1010 may be chosen depending on a network, such a Local Area Network (LAN), Wide Area Network (WAN), or any network to which computer system 1000 connects.

Memory 1015 can be Random Access Memory (RAM), or any other dynamic storage device commonly known in the art. Read only memory 1020 can be any static storage device(s) such as, but not limited to, a Programmable Read Only Memory (PROM) chips for storing static information such as start-up or BIOS instructions for processor 1005.

Mass storage 1025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1030 communicatively couples processor(s) 1005 with the other memory, storage and communication blocks. Bus 1030 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1005 to system memory.

Optionally, operator and administrative interfaces, such as a display, keyboard, and a cursor control device, may also be coupled to bus 1030 to support direct operator interaction with computer system 1000. Other operator and administrative interfaces can be provided through network connections connected through communication port 1010.

Removable storage media 1040 can be any kind of external hard-drives, floppy drives, IOMEGA® ZIP Drives, Compact Disc-Read Only Memory (CD-ROM), Compact Disc-Re-Writable (CD-RW), Digital Video Disk-Read Only Memory (DVD-ROM).

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:

maintaining, by a security information and event management (SIEM) device associated with a private network, a correlation policy database including a plurality of logical correlation policies defining conditions under which a particular security event observed within the private network is to be classified as a repeat security event of an original security event and defining conditions under which the particular observed security event is to be classified as a related security event of the original security event;

maintaining, by the SIEM device, an asset table containing information regarding a plurality of assets of the private network, wherein the asset table includes for each asset of the plurality of assets an internet protocol (IP) address of the asset and an asset value representing the relative importance of the asset to the private network;

maintaining, by the SIEM device, a plurality of inventory tables, including an inventory table for each of the plurality of assets, wherein the inventory table for a particular asset of the plurality of assets includes (i) a description of a plurality of attributes, including hardware and software attributes, of the particular asset and (ii) for each attribute of the plurality of attributes a reliability value representing a relative vulnerability to attack of the attribute;

programmatically collecting, by the SIEM device, information regarding a plurality of security events observed within the private network by receiving and processing network logs from a plurality of network security devices associated with the private network, wherein the information regarding the plurality of security events includes for each security event of the plurality of security events a destination IP address identifying an asset of the private network targeted by the security event;

for each security event of the plurality of security events:
reducing a number of the plurality of security events to be processed by
determining whether the security event represents a repeat security event or a related security event by conducting, by the SIEM device, a logical correlation of the security event with other of the plurality of security events including applying a matching logical correlation policy of the plurality of logical correlation policies to the security event; and
when said determining is affirmative, combining the security event with those of the plurality of security events that are related to the security event as specified by the matching logical correlation policy;
calculating, by the SIEM device, a risk level of the security event based on at least a correlation of the security event with one or more asset attributes of an asset of the plurality of assets targeted by the security event by:
identifying the targeted asset by performing a database lookup on the asset table based on the destination IP address of the security event;
retrieving reliability values of one or more asset attributes of the plurality of asset attributes of the targeted asset from an inventory table of the plurality of inventory tables associated with the targeted asset; and
adjusting the risk level based on the retrieved reliability values; and
when the risk level meets a predetermined or configurable threshold, then causing, by the SIEM device, the security event to be reported to an administrator of the private network.

2. The method of claim 1, further comprising decreasing the risk level of the security event if the targeted asset of the security event is not within the asset table.

3. The method of claim 1, further comprising:
matching a system vulnerability with the security event;
scanning the targeted device of the security event for the system vulnerability; and
increasing the risk level of the security event if the system vulnerability exists in the targeted device of the security event; and
decreasing the risk level of the security event if the system vulnerability does not exist in the targeted device of the security event.

4. The method of claim 3, wherein said matching a system vulnerability with the security event further comprises matching the system vulnerability based on a common vulnerabilities and exposures (CVE) attribute, a BugTraq attribute or an S3CVE attribute of the security event.

5. The method of claim 3, wherein said matching a system vulnerability with the security event further comprises matching the system vulnerability with the security event based on a local knowledge database.

6. A security information and event management (SIEM) system comprising:
a non-transitory storage device having embodied therein instructions representing a correlation engine; and
one or more processors coupled to the non-transitory storage device and operable to execute the correlation engine to perform a method comprising:
maintaining a correlation policy database including a plurality of logical correlation policies defining conditions under which a particular security event observed within a private network with which the SIEM device is associated is to be classified as a repeat security event of an original security event and defining conditions under which the particular observed security event is to be classified as a related security event of the original security event;
maintaining an asset table containing information regarding a plurality of assets of the private network, wherein the asset table includes for each asset of the plurality of assets an internet protocol (IP) address of the asset and an asset value representing the relative importance of the asset to the private network;
maintaining a plurality of inventory tables, including an inventory table for each of the plurality of assets, wherein the inventory table for a particular asset of the plurality of assets includes (i) a description of a plurality of attributes, including hardware and software attributes, of the particular asset and (ii) for each attribute of the plurality of attributes a reliability value representing a relative vulnerability to attack of the attribute;
programmatically collecting information regarding a plurality of security events observed within the private network by receiving and processing network logs from a plurality of network security devices associated with the private network, wherein the information regarding the plurality of security events includes for each security event of the plurality of security events a destination IP address identifying an asset of the private network targeted by the security event;
for each security event of the plurality of security events:
reducing a number of the plurality of security events to be processed by
determining whether the security event represents a repeat security event or a related security event by conducting, by the SIEM device, a logical correlation of the security event with other of the plurality of security events including applying a matching logical correlation policy of the plurality of logical correlation policies to the security event; and
when said determining is affirmative, combining the security event with those of the plurality of security events that are related to the security event as specified by the matching logical correlation policy;

calculating a risk level of the security event based on at least a correlation of the security event with one or more asset attributes of an asset of the plurality of assets targeted by the security event by:

identifying the targeted asset by performing a database lookup on the asset table based on the destination IP address of the security event;

retrieving reliability values of one or more asset attributes of the plurality of asset attributes of the targeted asset from an inventory table of the plurality of inventory tables associated with the targeted asset; and adjusting the risk level based on the retrieved reliability values; and when the risk level meets a predetermined or configurable threshold, then causing the security event to be reported to an administrator of the private network.

7. The SIEM system of claim 6, wherein the method further comprises decreasing the risk level of the security event if the targeted asset of the security event is not within the asset table.

8. The SIEM system of claim 6, wherein the method further comprises:

matching a system vulnerability with the security event;
scanning the targeted device of the security event for the system vulnerability; and
increasing the risk level of the security event if the system vulnerability exists in the targeted device of the security event; and
decreasing the risk level of the security event if the system vulnerability does not exist in the targeted device of the security event.

9. The SIEM system of claim 8, wherein said matching a system vulnerability with the security event further comprises matching the system vulnerability based on a common vulnerabilities and exposures (CVE) attribute, a BugTraq attribute or a S3CVE attribute of the security event.

10. The SIEM system of claim 8, wherein said matching a system vulnerability with the security event further comprises matching the system vulnerability with the security event based on a local knowledge database.

11. A non-transitory computer-readable storage medium embodying a set of instructions, which when executed by one or more processors of a security information and event management (SIEM) device, causes the one or more processors to perform a method comprising:

maintaining a correlation policy database including a plurality of logical correlation policies defining conditions under which a particular security event observed within a private network with which the SIEM device is associated is to be classified as a repeat security event of an original security event and defining conditions under which the particular observed security event is to be classified as a related security event of the original security event;

maintaining an asset table containing information regarding a plurality of assets of the private network, wherein the asset table includes for each asset of the plurality of assets an internet protocol (IP) address of the asset and an asset value representing the relative importance of the asset to the private network;

maintaining a plurality of inventory tables, including an inventory table for each of the plurality of assets, wherein the inventory table for a particular asset of the plurality of assets includes (i) a description of a plurality of attributes, including hardware and software attributes, of the particular asset and (ii) for each attribute of the plurality of attributes a reliability value representing a relative vulnerability to attack of the attribute;

programmatically collecting information regarding a plurality of security events observed within the private network by receiving and processing network logs from a plurality of network security devices associated with the private network, wherein the information regarding the plurality of security events includes for each security event of the plurality of security events a destination IP address identifying an asset of the private network targeted by the security event;

for each security event of the plurality of security events:
reducing a number of the plurality of security events to be processed by
determining whether the security event represents a repeat security event or a related security event by conducting, by the SIEM device, a logical correlation of the security event with other of the plurality of security events including applying a matching logical correlation policy of the plurality of logical correlation policies to the security event; and
when said determining is affirmative, combining the security event with those of the plurality of security events that are related to the security event as specified by the matching logical correlation policy;

calculating a risk level of the security event based on at least a correlation of the security event with one or more asset attributes of an asset of the plurality of assets targeted by the security event by:

identifying the targeted asset by performing a database lookup on the asset table based on the destination IP address of t security event;

retrieving reliability values of one or more asset attribute of the plurality of asset attributes of the targeted asset from an inventory table of the plurality of inventory tables associated with the targeted asset; and adjusting the risk level based on the retrieved reliability values; and when the risk level meets a predetermined or configurable threshold, then causing the security event to be reported to an administrator of the private network.

12. The non-transitory computer-readable storage medium of claim 11, wherein the method further comprises decreasing the risk level of the security event if the targeted asset of the security event is not within the asset table.

13. The non-transitory computer-readable storage medium of claim 11, wherein the method further comprises:

matching a system vulnerability with the security event;
scanning the targeted device of the security event for the system vulnerability; and
increasing the risk level of the security event if the system vulnerability exists in the targeted device of the security event; and
decreasing the risk level of the security event if the system vulnerability does not exist in the targeted device of the security event.

14. The non-transitory computer-readable storage medium of claim 13, wherein said matching a system vulnerability with the security event further comprises matching the system vulnerability based on a common vulnerabilities and exposures (CVE) attribute, a BugTraq attribute or a S3CVE attribute of the security event.

15. The non-transitory computer-readable storage medium of claim 13, wherein said matching a system vulnerability with the security event further comprises matching the system vulnerability with the security event based on a local knowledge database.

\* \* \* \* \*